United States Patent
Costa et al.

(10) Patent No.: US 10,652,075 B2
(45) Date of Patent: May 12, 2020

(54) SYSTEMS AND METHODS FOR SELECTING CONTENT ITEMS AND GENERATING MULTIMEDIA CONTENT

(71) Applicant: Facebook, Inc., Menlo Park, CA (US)

(72) Inventors: Fabio Miranda Costa, Mountain View, CA (US); James Cameron Ewing, San Francisco, CA (US); Joshua Warren Higgins, San Francisco, CA (US); Nicholas J. Kwiatek, San Francisco, CA (US); Kyre Madeleine Osborn, San Francisco, CA (US); Nathaniel Gregory Salciccoli, Palo Alto, CA (US); Skyler J. Vander Molen, San Francisco, CA (US); Shu Wu, Kirkland, WA (US)

(73) Assignee: Facebook, Inc., Menlo Park, CA (US)

( * ) Notice: Subject to any disclaimer, the term of this patent is extended or adjusted under 35 U.S.C. 154(b) by 904 days.

(21) Appl. No.: 14/279,144

(22) Filed: May 15, 2014

(65) Prior Publication Data

US 2015/0331842 A1    Nov. 19, 2015

(51) Int. Cl.
| | | |
|---|---|---|
| G06F 17/22 | (2006.01) | |
| G06F 17/24 | (2006.01) | |
| G06K 9/00 | (2006.01) | |
| H04L 29/08 | (2006.01) | |
| G11B 27/034 | (2006.01) | |
| G06Q 50/00 | (2012.01) | |

(52) U.S. Cl.
CPC ............. *H04L 29/08* (2013.01); *G06F 17/22* (2013.01); *G06F 17/24* (2013.01); *G11B 27/034* (2013.01); *H04L 67/02* (2013.01); *H04L 67/22* (2013.01); *G06Q 50/00* (2013.01)

(58) Field of Classification Search
CPC ....... G06Q 50/01; H04L 29/08; G06F 3/1242; G06F 16/583; G06F 16/739; G06F 17/22; G06F 17/27; G06F 17/241; G06F 17/243
USPC .......................................................... 715/201
See application file for complete search history.

(56) References Cited

U.S. PATENT DOCUMENTS

| | | | |
|---|---|---|---|
| 8,655,111 B2 * | 2/2014 | Berger | G06F 17/212 |
| | | | 382/306 |
| 10,084,961 B2 * | 9/2018 | MacMillan | G06F 16/71 |
| 2008/0040673 A1 * | 2/2008 | Zuckerberg | G06F 17/30867 |
| | | | 715/745 |

(Continued)

OTHER PUBLICATIONS

Fairburn, "Facebook Doesn't Always Show the Most Current Preview & Description When Sharing a Link," 2013, available at : https://www.morphsites.com/articles/17-forcing-facebook-to-refresh-its-cache (Year: 2013).*

*Primary Examiner* — Ariel Mercado
(74) *Attorney, Agent, or Firm* — Sheppard Mullin Richter & Hampton LLP

(57) ABSTRACT

Systems, methods, and non-transitory computer-readable media can detect a trigger event for generating multimedia content. A set of content items associated with a user account can be identified. Information associated with at least one of the set of content items or the user account can be acquired. A subset of content items can be selected out of the set of content items based on the information. In some embodiments, each content item in the subset can satisfy specified selection criteria. The multimedia content can be generated based on the subset of content items.

19 Claims, 10 Drawing Sheets

(56) References Cited

U.S. PATENT DOCUMENTS

| | | | |
|---|---|---|---|
| 2008/0306995 A1* | 12/2008 | Newell | G06F 16/51 |
| 2011/0035406 A1* | 2/2011 | Petrou | G06F 17/30047 |
| | | | 707/769 |
| 2011/0063503 A1* | 3/2011 | Brand | H04N 5/4401 |
| | | | 348/500 |
| 2013/0031034 A1* | 1/2013 | Gubin | G06Q 10/06393 |
| | | | 706/12 |
| 2016/0371534 A1* | 12/2016 | Koul | G06K 9/00 |

* cited by examiner

800

Modify the subset of content items to produce a modified set of content items
802

Generate, in real-time, modified multimedia content based on the modified set
804

Provide, in real-time, the modified multimedia content
806

SYSTEMS AND METHODS FOR SELECTING CONTENT ITEMS AND GENERATING MULTIMEDIA CONTENT

FIELD OF THE INVENTION

The present technology relates to the field of multimedia content. More particularly, the present technology provides techniques for selecting content items and generating multimedia content.

BACKGROUND

The use of computing devices or systems is becoming increasingly commonplace. Users of computing devices often browse web sites, access online content, interact with social networks, or perform a wide variety of tasks. In some cases, users can use their computing devices to create and provide content items, such as images, audio, text, status updates, comments, and/or posts. The content items can be presented and stored by social networking services or social media services. In some cases, users can utilize computing devices to access or interact with multimedia content, such as video content made available via the social networking services or social media services. Under conventional approaches, the video content must be rendered, by one or more computing devices, at some time prior to the user watching the video content.

In one example, the user can further interact with the video content by modifying or editing the video content. Under conventional approaches, the user can edit or otherwise modify the video content, but the edited or modified video content must be rendered before it can be watched or accessed, which can be inconvenient or inefficient. These and other concerns can create challenges for or reduce the overall user experience associated with accessing or otherwise interacting with multimedia content.

SUMMARY

Various embodiments of the present disclosure can include systems, methods, and non-transitory computer readable media configured to detect a trigger event for generating multimedia content. A set of content items associated with a user account can be identified. Information associated with at least one of the set of content items or the user account can be acquired. A subset of content items can be selected out of the set of content items based on the information. In some embodiments, each content item in the subset can satisfy specified selection criteria. The multimedia content can be generated based on the subset of content items.

In one embodiment, the user account can be provided with access to the multimedia content. In some cases, the generating the multimedia content can include pre-rendering the multimedia content prior to the providing the user account with the access to the multimedia content.

In one embodiment, the generating the multimedia content can include processing the subset of content items by one or more servers of a social networking system (or service). In some instances, an amount of the processing can be based on a level of user traffic experienced by the social networking system.

In one embodiment, the subset of content items can be modified, based on one or more commands associated with the user account, to produce a modified set of content items. Modified multimedia content can be generated, in real-time, based on the modified set of content items. Further, the modified multimedia content generated based on the modified set of content items can be provided in real-time.

In one embodiment, the generating, in real-time, the modified multimedia content based on the modified set of content items can include transmitting at least one instruction to a computing device associated with the user account causing the computing device to render the modified multimedia content in real-time using HTML5

In one embodiment, each content item in the subset of content items can be at least one of a post, a status update, or an image, and the multimedia content can include video.

In one embodiment, the generating the multimedia content can include providing audio content. In some implementations, the audio content can be selected based on one or more commands provided via the user account.

In one embodiment, the audio content can be analyzed to determine one or more beats of the audio content. In some instances, at least a portion of the multimedia content can be synchronized, within an allowable time deviation, with the one or more beats of the audio content.

In one embodiment, the trigger event can be associated with at least one of a significant event associated with the user account within a social networking system, a user command initiated via the user account, or a system command of the social networking system.

In one embodiment, the trigger event can be associated with the significant event associated with the user account, and the detecting of the trigger event can include analyzing at least one of a post associated with the user account, a status update associated with the user account, a comment associated with the user account, a tag associated with the user account, or an interaction associated with the user account.

In one embodiment, the selecting the subset of content items out of the set of content items can include ranking the set of content items based on a ranking algorithm. In some implementations, the specified selection criteria can include one or more ranking thresholds, and each content item in the subset of content items can satisfy the one or more ranking thresholds.

In one embodiment, at least some of the content items can include images, and the ranking algorithm can utilize an image classification process.

In one embodiment, the ranking algorithm can increase rankings for at least some content items determined by the image classification process to include faces and can decrease rankings for at least some content items determined by the image classification process to include at least one of memes or food.

In one embodiment, the ranking algorithm can utilize social interaction analysis.

In one embodiment, the ranking algorithm can increase rankings for at least some content items determined by the social interaction analysis to be associated with a current relationship associated with the user account and can decrease rankings for at least some content items determined by the social interaction analysis to be associated with a terminated relationship associated with the user account.

In one embodiment, at least a first content item in the subset of content items can be associated with a first time period and at least a second content item in the subset of content items can be associated with a second time period.

In one embodiment, at least a first content item in the subset of content items can be associated with a first location and at least a second content item in the subset of content items can be associated with a second location.

In one embodiment, the user account can be associated with at least one of a user of a social networking system, an entity associated with the social networking system, a group associated with the social networking system, a post on the social networking system, an application provided via the social networking system, or an event created at the social networking system.

Many other features and embodiments of the invention will be apparent from the accompanying drawings and from the following detailed description.

Figure 1:
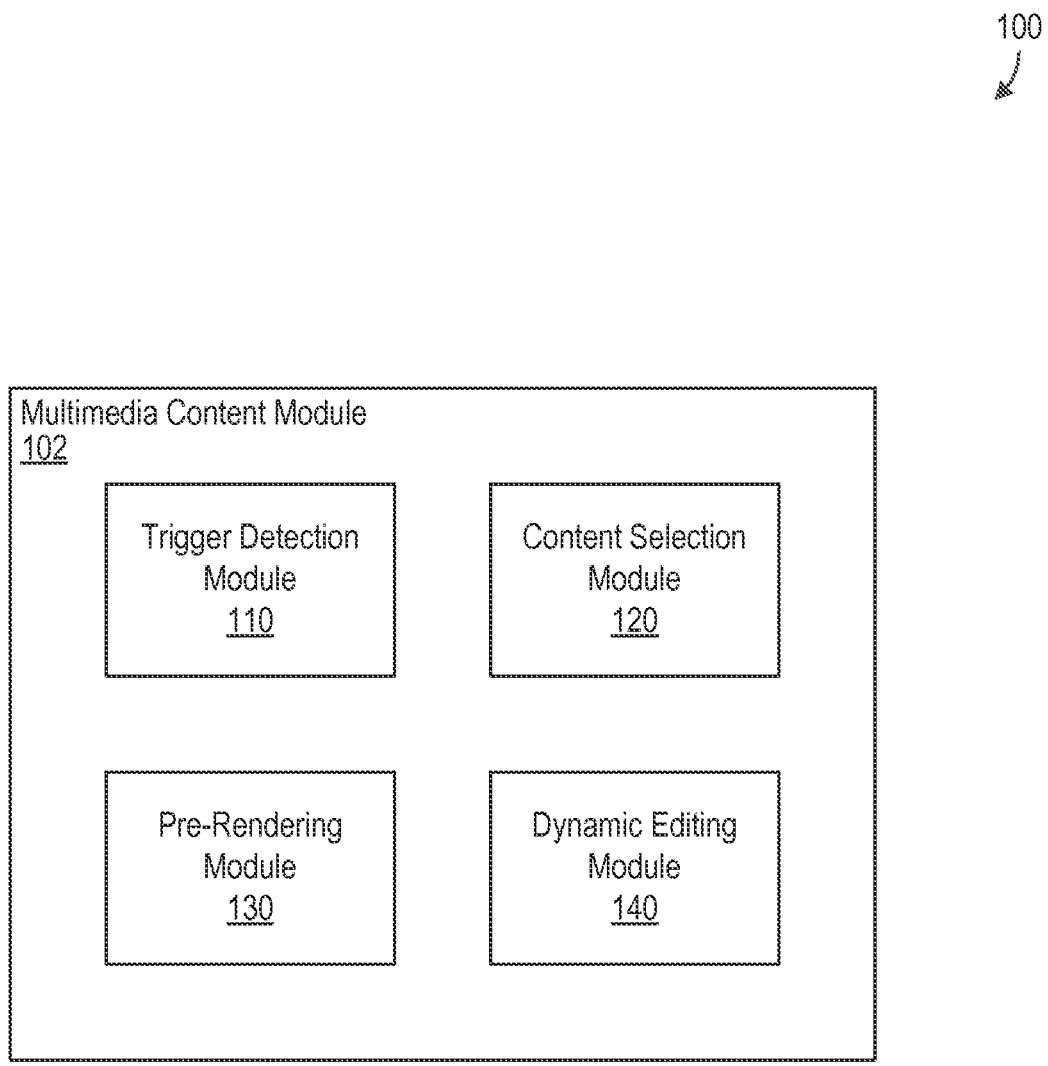
FIG. 1 illustrates an example system configured to facilitate selecting content items and generating multimedia content, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Selecting and Generating Multimedia Content

People often access or interact with multimedia content using their computing devices. Users of computing devices frequently access multimedia content, such as by watching or viewing video content. Sometimes, users also use their computing devices to edit or modify the video content. Furthermore, users of computing devices can create and publish content items, such as images, audio, text, status updates, and/or posts, etc., via various social networking or media systems. In some cases, social networking systems (or services) or social media systems (or services) can store and access the content items. Various embodiments of the present disclosure can select content items that are likely relevant, important, significant, and/or meaningful, etc., to a particular user and can generate multimedia content based on the selected content items.

FIG. 1 illustrates an example system 100 configured to facilitate selecting content items and generating multimedia content, according to an embodiment of the present disclosure. The example system 100 can include a multimedia content module 102. The multimedia content module 102 can be configured to process, manage, and/or handle various tasks associated with selecting content items and generating multimedia content. For example, the multimedia content module 102 can be configured to select one or more content items, such as images, audio, text, or posts, based on at least one selection algorithm or process. In this example, the multimedia content module 102 can then generate the multimedia content, such as a video, based on the selected content items.

Continuing with FIG. 1, the multimedia content module 102 can, for example, comprise a trigger detection module 110, a content selection module 120, a pre-rendering module 130, and a dynamic editing module 140. In some embodiments, the multimedia content module 102 and/or any portions, components, or modules within the multimedia content module 102 can be implemented as hardware, software, or any combination thereof. In some embodiments, the multimedia content module 102 can be implemented within, reside on, and/or operate in conjunction with a social networking system, such as the social networking system discussed with reference to FIG. 9.

In one example, the multimedia content module 102 can utilize the trigger detection module 110 to detect, determine, or identify a trigger. The trigger can cause the multimedia content module 102 to acquire or access a set (i.e., one or more) of content items associated with a user or user account of a social networking system. The multimedia content module 102 can utilize the content selection module 120 to select at least some content items out of the set of content items (i.e., select a subset of content items out of the set of content items). Subsequent to selecting the at least some content items, the multimedia content module 102 can generate the multimedia content, such as by using the pre-rendering module 130 to pre-render video content created using at least a portion of the selected subset of the content items. In some embodiments, the multimedia content module 102 can utilize the dynamic editing module 140 to enable "on-the-fly" (i.e., real-time or near real-time) modification to the video content. In some cases, the multimedia content module 102 can enable the modified video content to be rendered "on-the-fly" or dynamically. The video content may be presented in a variety of contexts. With respect to a social networking system, the video content may be presented in myriad locations, such as a timeline of a user, a newsfeed story to friends of the user, or any other context in which multimedia content may be presented to and consumed by the user or other users with appropriate rights to view the video content.

It is contemplated that numerous variations can be possible. For example, in some instances, a portion, component, or module within the multimedia content module 102 can be omitted or optionally implemented. In some cases, the multimedia content module 102 can include one or more other modules or components not explicitly illustrated in FIG. 1. The depicted components in this figure and the other figures discussed herein are exemplary only, and may be variously replaced by, combined with, or integrated into other similar components.

Figure 2:
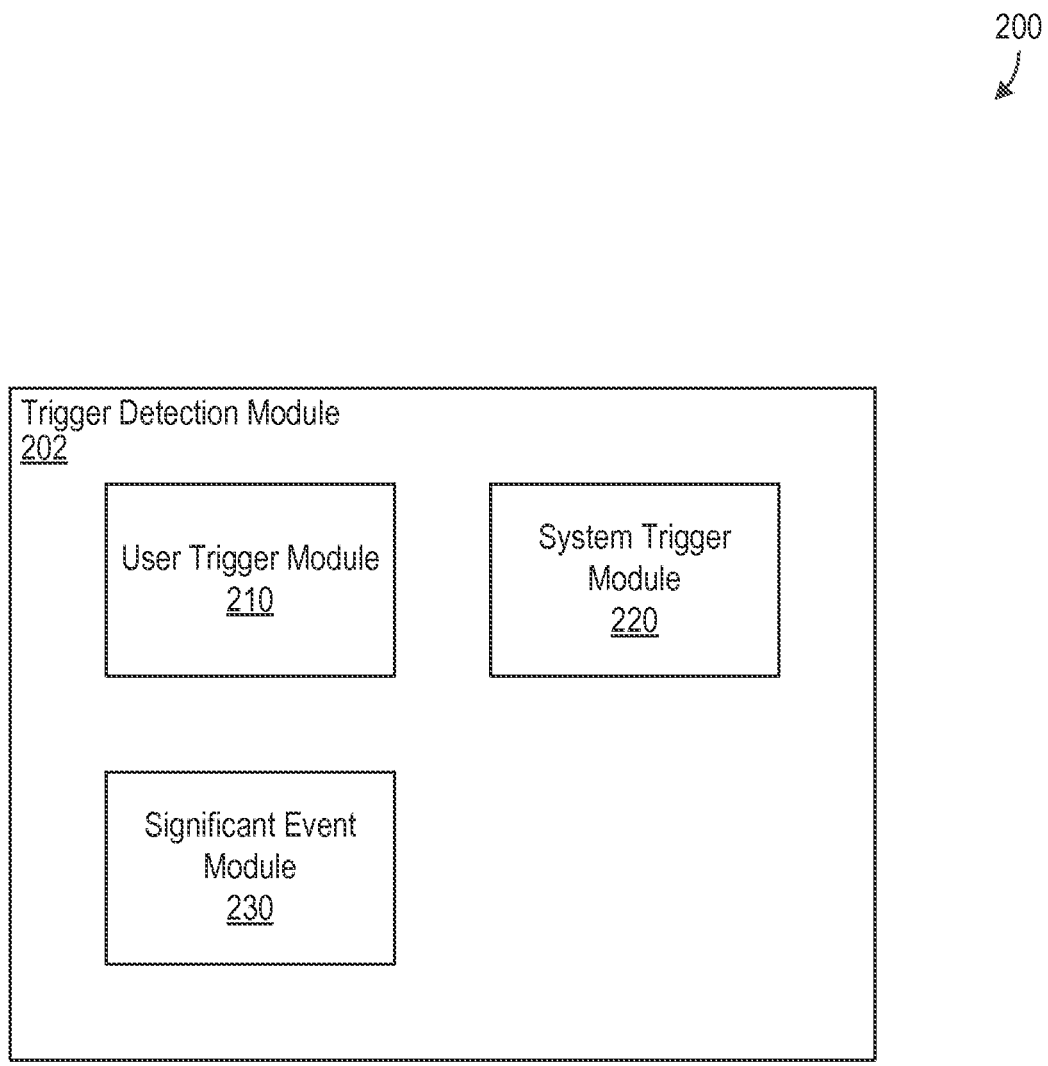
FIG. 2 illustrates an example system configured to facilitate selecting content items and generating multimedia content, according to an embodiment of the present disclosure.

With reference to FIG. 2, an example system 200 configured to facilitate selecting content items and generating multimedia content, according to an embodiment of the present disclosure, is illustrated. The example system 200 can include a trigger detection module 202. The trigger detection module 202 can be configured to facilitate detecting, determining, or identifying a trigger (also known as a trigger event). In some embodiments, the trigger can cause an initiation of content items to be selected and the multimedia content to be generated. In some cases, the trigger detection module 202 can correspond to the trigger detection module 110 of FIG. 1.

As shown in the example of FIG. 2, the trigger detection module 202 can include a user trigger module 210, a system trigger module 220, and a significant event module 230. The user trigger module 210 can be configured to detect, determine, or identify a user trigger. In some cases, a user trigger can include one or more instructions initiated via a user account, such as one or more commands initiated by a user of a social networking system who is signed or logged into the user account. In one example, a button can be clicked via the user account (e.g., by the user associated with the user account), which can trigger or initiate the selecting of the content items and the generating of the multimedia content item. In another example, a user trigger can be detected by the user trigger module 210 when the user account accesses a particular web resource, such as when the user visits a particular URL associated with the social networking system while signed into the user account.

Continuing with FIG. 2, the system trigger module 220 can be configured to detect (or determine, identify, etc.) a system trigger. The system trigger can include one or more system commands or instructions to initiate the selecting of the content items and the generating of the multimedia content. In one example, the system trigger can include an instruction or command provided by the multimedia content module 102 of FIG. 1 or by a module associated with the multimedia content module 102. In another example, if the multimedia content module 102 is implemented within or is operating in conjunction with the social networking system, then the social networking system can cause or provide the system trigger.

Moreover, the significant event module 230 can be configured to detect significant events, such as significant events experienced, encountered, or undergone by the user associated with the user account via the social networking system. For example, a significant event can include but is not limited to a life event experienced and/or posted by the user or user account at the social networking system, such as the user entering into a relationship, getting engaged, getting married, having children, etc. In some cases, such significant events can trigger or initiate the selecting of the content items and the generating of the multimedia content. In some instances, a significant event can include a significant post by the user at the social networking system, such as a status update determined to be significant, a comment determined to be significant, a "Like" determined to be significant, etc. It is contemplated that numerous other variations are possible.

Figure 3:
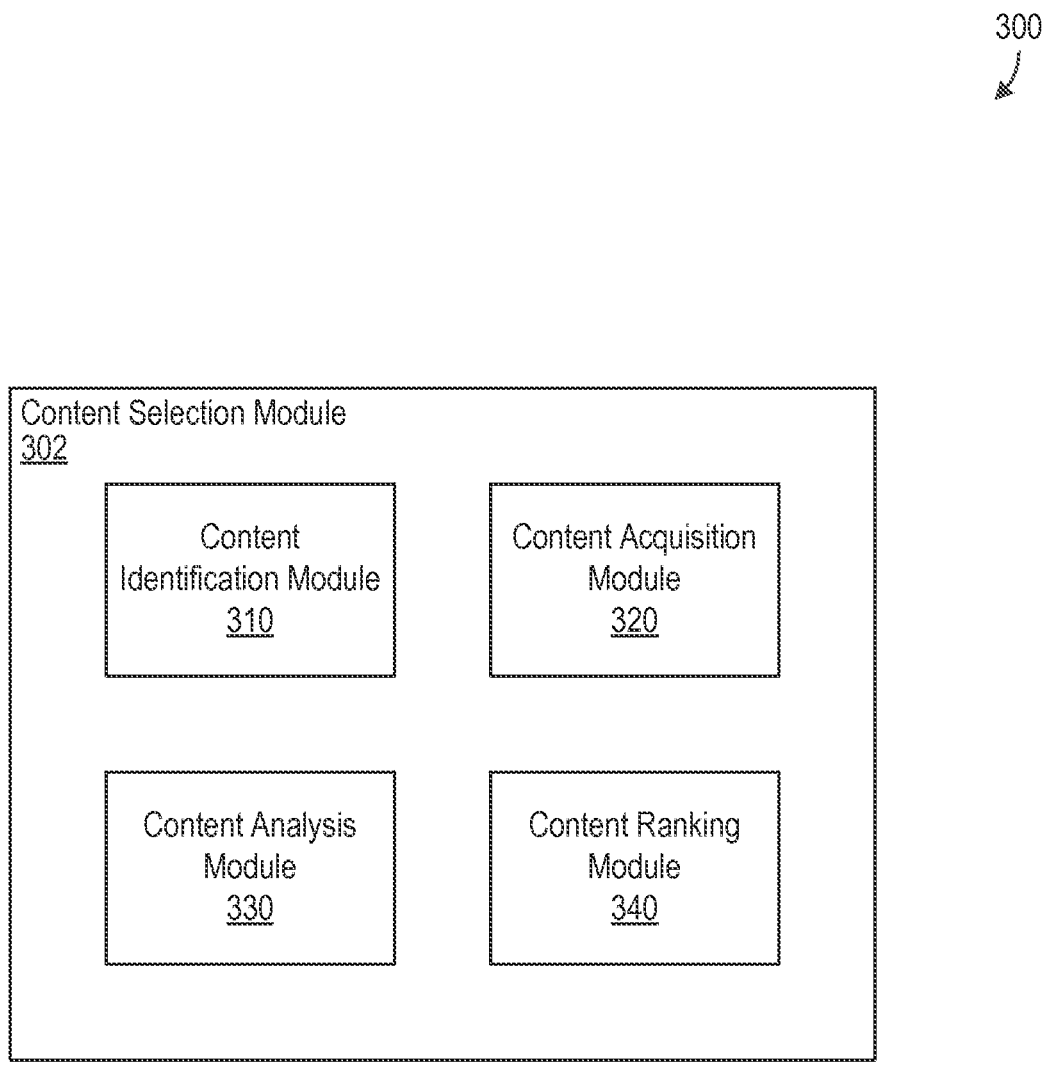
FIG. 3 illustrates an example system configured to facilitate selecting content items and generating multimedia content, according to an embodiment of the present disclosure.

FIG. 3 illustrates an example system 300 configured to facilitate selecting content items and generating multimedia content, according to an embodiment of the present disclosure. The example system 300 can include a content selection module 302. The content selection module 302 can be configured to select one or more content items out of a set of content items. For example, the content selection module 302 can utilize one or more selection algorithms to select a subset of content items out of the set of content items. In some cases, the content selection module 302 can correspond to the content selection module 120 of FIG. 1.

As shown in FIG. 3, the content selection module 302 can, for example, comprise a content identification module 310, a content acquisition module 320, a content analysis module 330, and a content ranking module 340. In some instances, the content identification module 310 can identify a set of content items associated with a particular user or user account, such as a particular user or user account of a social networking system.

In one example, a first user account can create, provide, or present a first set of content items at the social networking system, and a second user account can create, provide, or present a second set of content items at the social networking system. If a trigger event for selecting content items and generating multimedia content is detected for the first user account, then the content identification module 310 can identify, determine, or locate the first set of content items since the first set is associated with the first user account; if a trigger event is detected for the second user account, then the content identification module 310 can identify the second set of content items; and so forth.

The content acquisition module 320 can be configured to acquire or access the identified set of content items and/or information related to the identified set of content items. For example, the content acquisition module 320 can acquire or access the set of content items and/or related information associated with the particular user or user account, subsequent to the set being identified by the content identification module 310.

As discussed previously, the content selection module 302 can utilize one or more selection algorithms to select content items. The selection algorithms can include one or more content item analysis techniques or algorithms, which can be run, implemented, managed, and/or operated by the content analysis module 330. The content analysis module 330 can be configured to run or apply the content item analysis techniques to the acquired set of content items (and/or related information) in order to analyze the acquired set of content items (and/or related information). Based on the analysis, the set of content items can be ranked by the content ranking module 340.

In some cases, the one or more selection algorithms can include one or more content item ranking techniques or algorithms. The content ranking module 340 can utilize information acquired from the analysis of the set of content items and apply the ranking techniques to rank and/or calculate a score for each content item in the set of content items. A subset of content items that satisfies specified selection criteria can then be selected out of the set of content items. For example, the specified selection criteria can include one or more ranking thresholds or scores, such that only those content items that at least meet the ranking thresholds or scores are selected to be included in the subset.

The ranking of the set of content items can attempt to quantify, represent, determine, predict, and/or approximate how likely each content item in the set is to be relevant, important, significant, and/or meaningful. The quantification (or representation, determination, prediction, approximation, etc.) of the relevance, importance, significance, and/or meaningfulness, etc., of each content item can be objective or can be relative to the particular user or user account.

In one example, a first content item in the set can correspond to a status update or a post provided by the particular user or user account via the social networking system. In some implementations, the content analysis module 330 can analyze text included in the status update or post, in attempt to determine the first content item's relevance, importance, significance, and/or meaningfulness, etc. In some implementations, the content analysis module 330 can analyze information related to the first content item, such as one or more properties of the first content item, metadata (e.g., tags) for the first content item, various signals associated with the first content item, and/or other data related to the first content item. For example, the related information can indicate how many "Likes" the first content item received, how many comments the first content item received, how many times the first content item was shared, who shared the first content item (e.g., close social connections or remote social connections), with whom the first content item was shared, and/or various other possibilities. Content items that are considered to be more relevant, important, and/or meaningful can be ranked higher. Those content items that are ranked sufficiently high, such as those that at least meet certain ranking thresholds, can be included in the selected subset of content items.

In another example, a second content item in the set can correspond to an image created or provided by the particular user or user account via the social networking system. In some embodiments, the one or more selection algorithms discussed above can include one or more image classification techniques. For example, in some implementations, the content analysis module 330 and/or the content ranking module 340 can correspond to, perform the functions of, and/or work in conjunction with an image classification module. In some cases, the image classification module can apply the one or more image classification techniques to the second content item, which is an image. The image classification module can be configured to gather contextual cues from a sample set of images and use the contextual cues to generate a training set of images. The training set of images can be used to train a classifier to generate visual pattern templates of an image class. The classifier can categorize the image second content item, based on its correlation to the visual pattern templates, into a particular image class. If the image second content item is categorized or classified into an undesirable, irrelevant, and/or unimportant image class (e.g., synthetic image class, food image class, meme image class, cat image class, etc.), then the second content item can receive a lower ranking. If the second content item is classified into a desirable, relevant, and/or important image class (e.g., face image class, person image class, close social connection image class, etc.), then the second content item can received a higher ranking. If the second content item is sufficiently high-ranked, then the second content item can be selected into the subset of content items. Likewise, in some embodiments, the one or more selection algorithms discussed above can include one or more facial recognition techniques. For example, in some implementations, the content analysis module 330 and/or the content ranking module 340 can correspond to, perform the functions of, and/or work in conjunction with a facial recognition module. The facial recognition module may apply one or more facial recognition techniques to ascertain the identity of persons in one or more images. Images including identified persons with certain threshold affinity to the user or the user account may be ranked. In some embodiments, affinities may be based on coefficients between the particular user or the user account and persons identified in the image. Images of identified persons that are sufficiently high-ranked can be selected into the subset of content items. Facial detection and/or recognition may be applied subject to a user's opt-in action, user privacy settings, and/or other manifestation of user preferences regarding privacy.

Further, in some embodiments, the one or more content item analysis techniques or algorithms can analyze social interactions experienced, encountered, or undergone by the user or user account. Moreover, the one or more content item ranking techniques or algorithms can utilize the social interaction analysis. For example, the one or more content item ranking techniques or algorithms can increase rankings for at least some content items determined by the social interaction analysis to be associated with a current relationship of the user account and can decrease rankings for at least some content items determined by the social interaction analysis to be associated with a terminated relationship of the user account. Again, the sufficiently high-ranked content items can be selected into the subset.

It is further contemplated that there can be numerous variations, possibilities, and/or other approaches to selecting content items. For example, in some implementations, content items can be selected based on social history (e.g., timeline data, profile data, etc.), machine learning, privacy, engagement signals, etc.

In some implementations, multimedia content can be generated based on the selected subset of content items. For example, a video can be generated using at least some content items within the subset of content items. Continuing with this example, in some cases, generating the video can include pre-rendering the video, which will be discussed in more detail with reference to FIG. 4.

Figure 4:
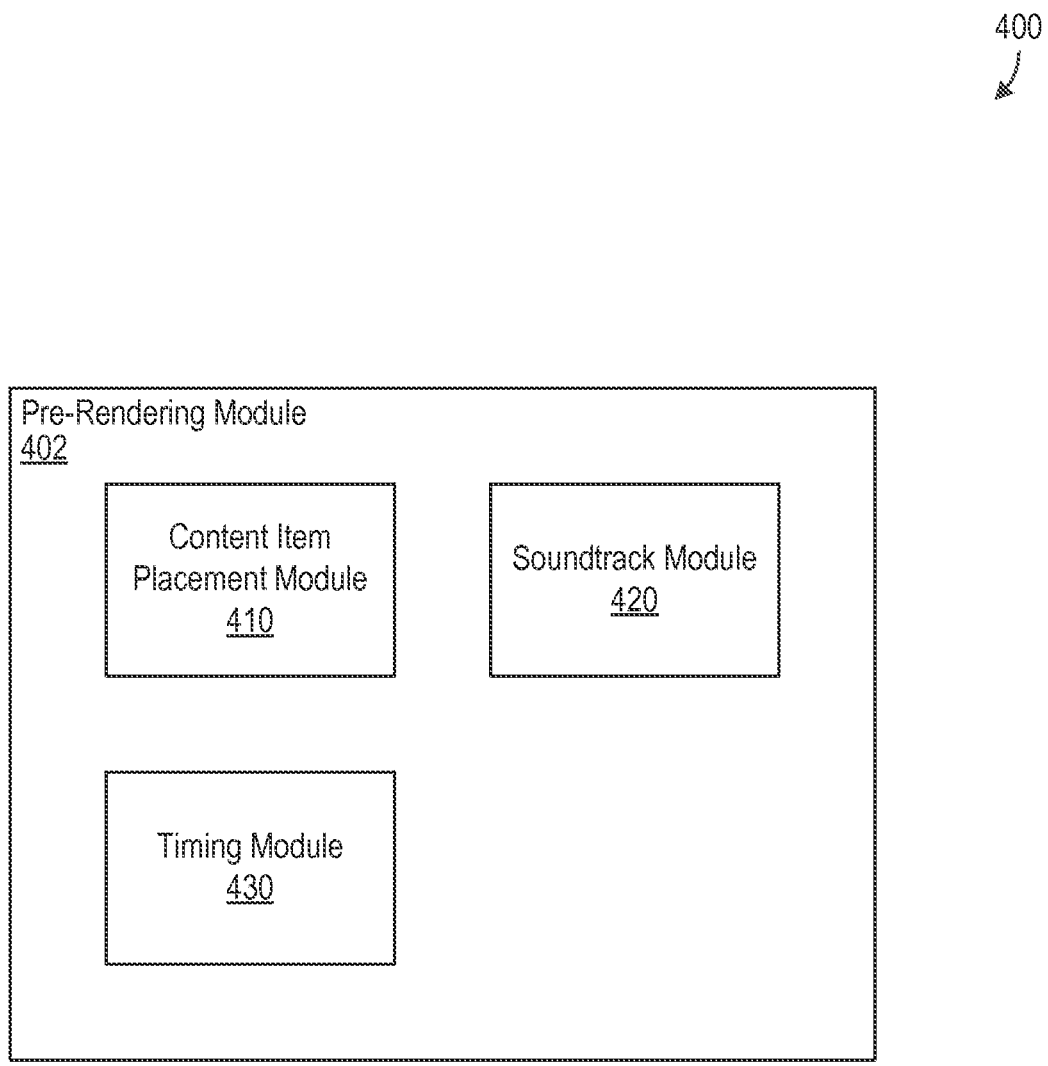
FIG. 4 illustrates an example system configured to facilitate selecting content items and generating multimedia content, according to an embodiment of the present disclosure.

FIG. 4 illustrates an example system 400 configured to facilitate selecting content items and generating multimedia content, according to an embodiment of the present disclosure. The example system 400 can include a pre-rendering module 402. The pre-rendering module 402 can be configured to generate multimedia content based on selected content items, such as by pre-rendering video content using one or more content items within a selected subset of content items. In some instances, the pre-rendering module 402 can correspond to the pre-rendering module 130 of FIG. 1.

In the example of FIG. 4, the pre-rendering module 402 can comprise a content item placement module 410, a soundtrack module 420, and a timing module 430. The content item placement module 410 can be configured to facilitate generating the multimedia content, such as video content, by placing or inserting at least some of the selected subset of content items into the video content. In one example, with respect to content items that are images, the content item placement module 410 can place the image content items into the video content such that the image content items can serve as at least partial video frames within the video content. In another example, the content item placement module 410 can convert text, status updates, posts, and/or other non-visual content items into image representations and can place the image representations into the video content. The image representations can serve as at least partial video frames within the video content. As such, multimedia content such as video content can be generated based on one or more selected content items.

Moreover, the soundtrack module 420 can be configured to facilitate the generating of the multimedia content, such as the video content, by providing a soundtrack or audio for the video content. In some cases, the soundtrack module 420 can be configured to choose the soundtrack to be incorporated into the video content. In some instances, the soundtrack module 420 can receive one or more commands associated with a user or user account of a social networking system, the one or more commands instructing the soundtrack module 420 to incorporate a soundtrack selected by the user or user account.

Furthermore, the timing module 430 can optionally be implemented within the pre-rendering module 402. In some implementations, the timing module 430 can be configured to coordinate the timing between the soundtrack and at least some of the selected content items used to generate the video content. For example, the timing module 430 can work in conjunction with the content item placement module 410 and/or the soundtrack module 420 to ensure that the timing between the displaying of particular content items and the playing of particular portions of the soundtrack is desirable or appropriate. In another example, the timing module 430 can analyze the soundtrack or audio content to determine one or more beats of the soundtrack or audio content. The timing module 430 can synchronize, within an allowable time deviation (e.g., a few seconds, a fraction of a second, a few beats, a single beat, etc.), at least a portion of the multimedia content with the one or more beats of the audio content.

In some embodiments, the pre-rendering module 402 can facilitate generating of the multimedia content by pre-rendering the multimedia content, or rendering the multimedia content at a time prior to the multimedia content being accessed. In some implementations, the generating (e.g., pre-rendering) of the multimedia content can be throttled based on server availability and/or capacity. For example, a selected subset of content items can be stored at a social networking system and the generating of the multimedia content can include processing the subset of content items by one or more servers of the social networking system, wherein an amount of the processing is based on a level of user traffic experienced by the social networking system. For example, processing can be increased when there is less user traffic and can be decreased when there is more user traffic.

Figure 5:
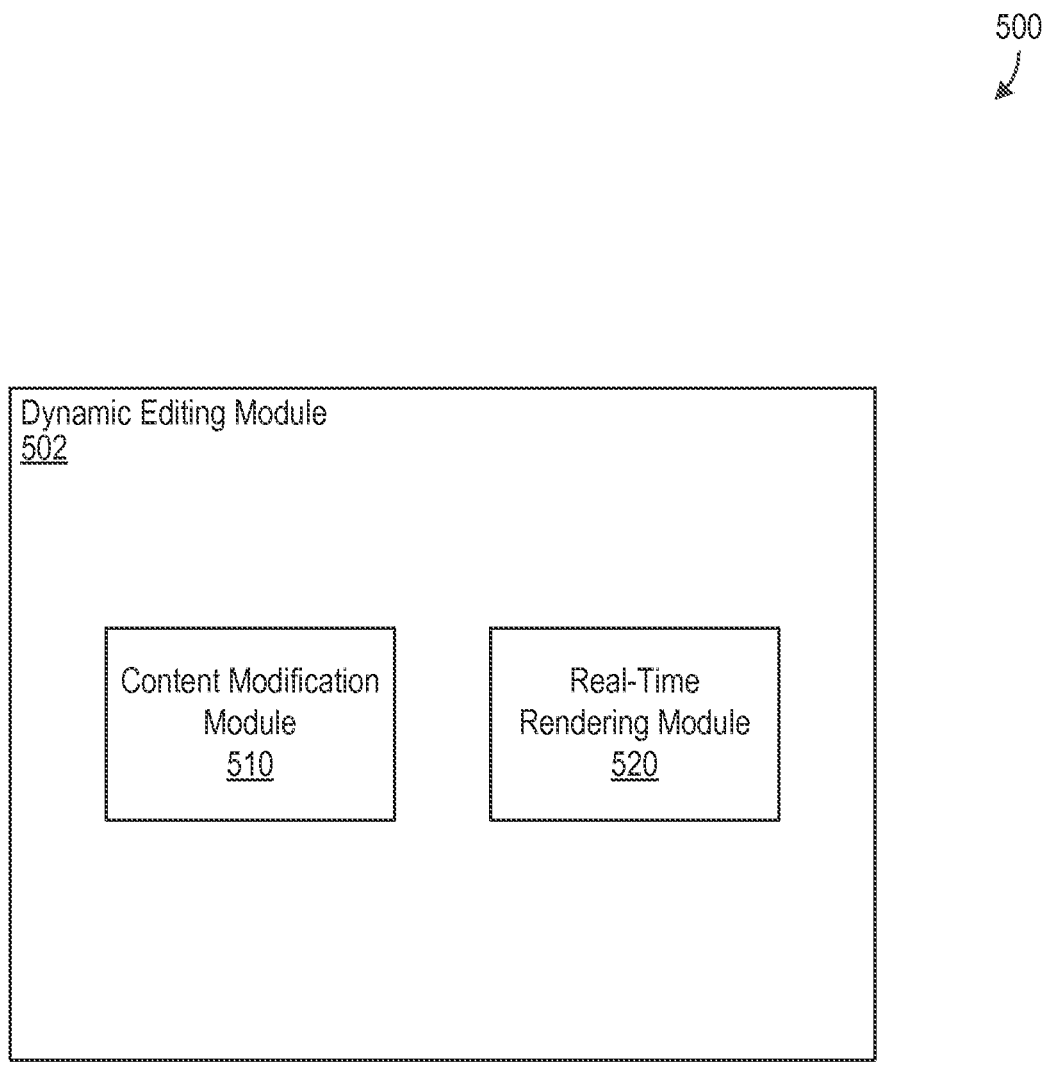
FIG. 5 illustrates an example system configured to facilitate selecting content items and generating multimedia content, according to an embodiment of the present disclosure.

FIG. 5 illustrates an example system 500 configured to facilitate selecting content items and generating multimedia content, according to an embodiment of the present disclosure. The example system 500 can include a dynamic editing module 502. The dynamic editing module 502 can be configured to enable multimedia content to be modified dynamically and/or rendered "on-the-fly" in real-time (or near real-time). In some instances, the dynamic editing module 502 can correspond to the dynamic editing module 140 of FIG. 1.

The dynamic editing module 502 can comprise a content modification module 510 and a real-time rendering module 520. The content modification module 510 can be configured to enable multimedia content to be modified or edited. In some cases, multimedia content such as video content can be generated, for example, by the pre-rendering module 402 of FIG. 4. The content modification module 510 can be configured to receive one or more instructions, such as user commands from a particular user or user account of a social networking system, to edit the video content based on the received instructions.

In one example, the content modification module 510 can provide the user (or user account) with a set of content items associated with the user (or user account). The video content can be generated using a subset of the set of content items. The content modification module 510 can enable the user to modify the subset of content items used to generate the video content. The user can, for example, modify the subset by altering which content items are to be included in a modified set and which content items are to be excluded from the modified set, wherein the modified set of content items is used to generate modified video content.

The real-time rendering module 520 can enable multimedia content, such as video content, to be generated in real-time (or near real-time). The real-time rendering module 520 can enable the rendering of video content, based on selected content items, in real-time. Continuing with the previous example, given a modified set of content items, the real-time rendering module 520 can render the modified video content as soon as the modified set of content items is selected. When the user selects certain content items to form the modified set on which the modified video content is to be based, the real-time rendering module 520 can render the modified video content "on-the-fly" such that the modified video content can be played or presented immediately (or almost immediately).

Figure 6:
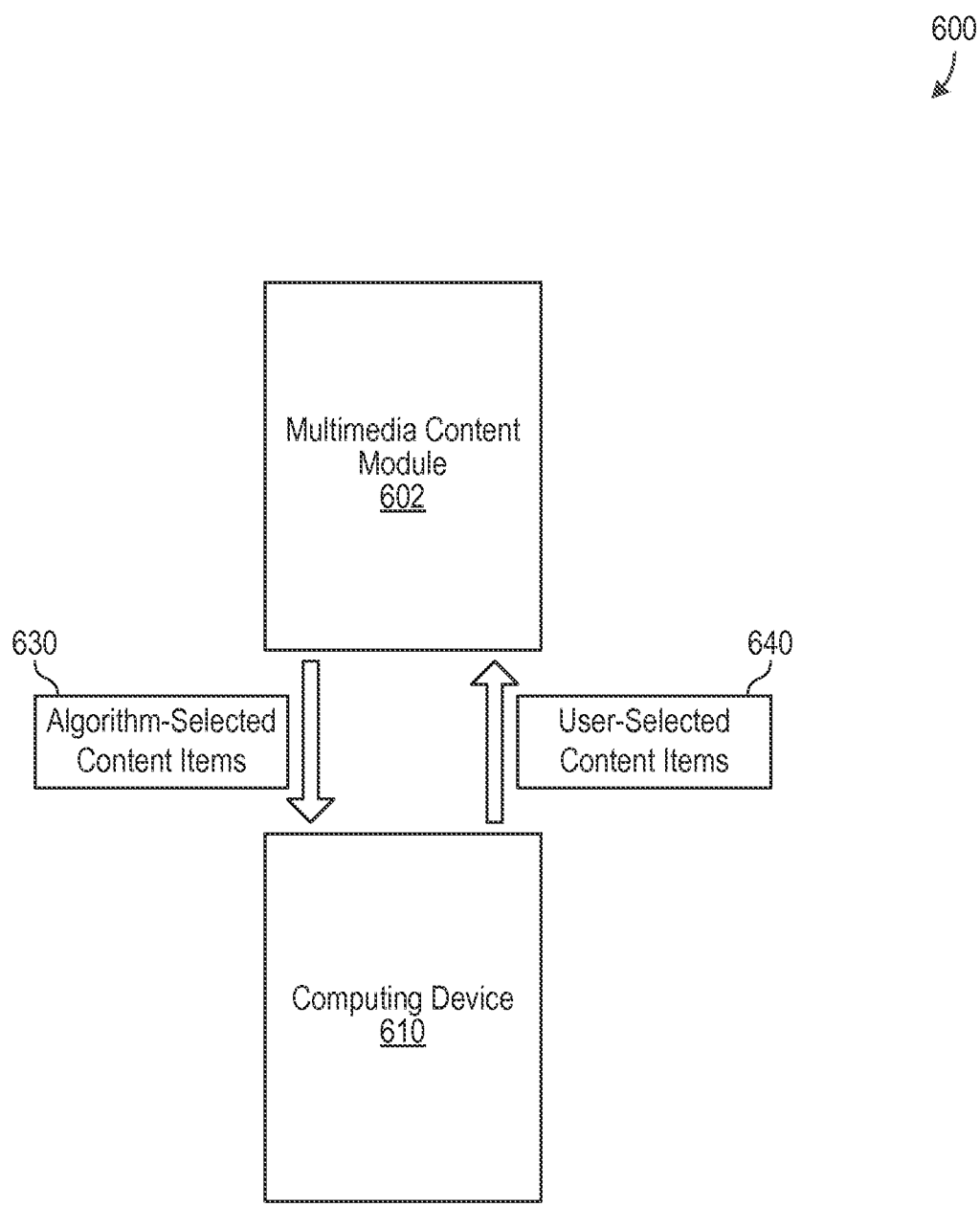
FIG. 6 illustrates an example environment in which selecting content items and generating multimedia content can occur, according to an embodiment of the present disclosure.

With reference to FIG. 6, an example environment 600 in which selecting content items and generating multimedia content can occur, according to an embodiment of the present disclosure, is illustrated. The example environment 600 can include a multimedia content module 602 and a computing device 610. The multimedia content module 602 can, for example, correspond to the multimedia content module 102 of FIG. 1.

In one example, the multimedia content module 602 can utilize one or more selection algorithms or machine processes to select content items to be used for generating multimedia content for a user (or user account). The set of content items 630 selected by the multimedia content module 602 can be presented, provided, or made accessible to the user via the computing device 610. In this example, the user can modify the content items and thus modify the multimedia content by selecting a subset of content items 640, out of the set 630, that he or she wants to be included in the (modified) multimedia content.

Continuing with the example, since the computing device 610 can be provided with the set of content items 630 selected by the multimedia content module 602, the computing device 610 can store or at least temporarily cache the set of content items 630 locally. Moreover, it follows that the subset of content items 640 selected by the user can also be stored or at least temporarily cached locally at the computing device 610. As such, the multimedia content module 602 can enable modified multimedia content to be generated or rendered in (or near) real-time using the locally stored subset of content items 640. In some embodiments, a dynamic editing module of the multimedia content module 602 can enable the computing device 610 to use, for example, HTML5 to render the multimedia content in real-time based on the locally stored or cached subset of content items 640. In this example, since the subset of content items 640 is already locally stored or cached at the computing device 610, the computing device 610 can access and/or process the subset 640 efficiently in order to render the multimedia content in real-time. As soon as the user-selected subset of content items 640 is chosen, the multimedia content can be generated or rendered in real-time, and the multimedia content can be presented or played immediately at the computing device 610.

In some embodiments, the dynamic editing and real-time rendering of the multimedia content does not necessitate the creation or generation of a data file or data object for the multimedia content. For example, conventional approaches to generating a video can include creating a video file or video object. However, the present disclosure can enable the multimedia content to be generated dynamically and in real-time, for example, by causing a local computing device (e.g., device 610) to render the multimedia content using HTML5 and without creating a data file or data object for the multimedia content.

Figure 7:
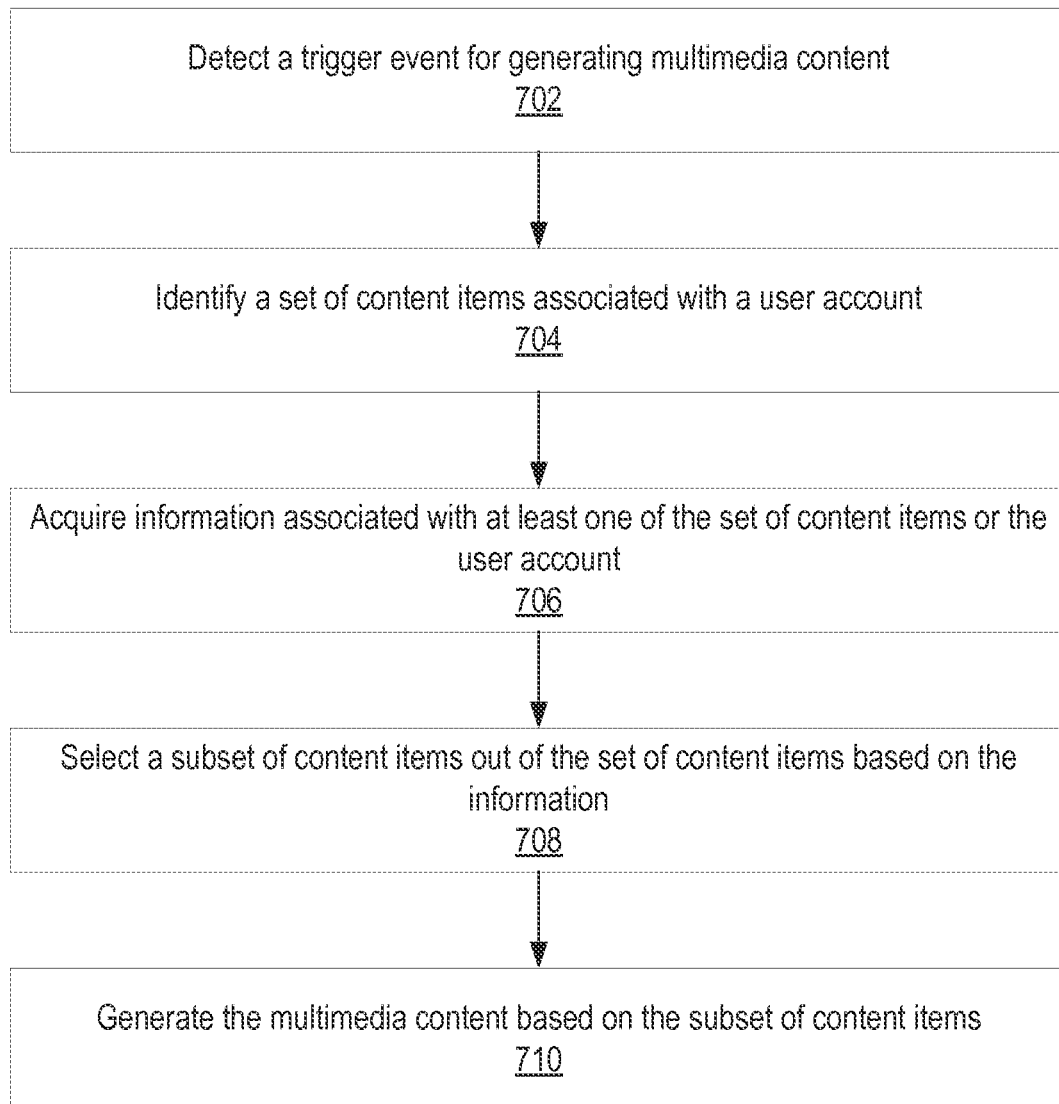
FIG. 7 illustrates an example method for selecting and generating multimedia content, according to an embodiment of the present disclosure.

FIG. 7 illustrates an example method 700 for selecting content items and generating multimedia content, according to an embodiment of the present disclosure. It should be appreciated that there can be additional, fewer, or alternative steps performed in similar or alternative orders, or in parallel, within the scope of the various embodiments unless otherwise stated.

The example method 700 can detect a trigger event for generating multimedia content, at block 702. The trigger event can include, for example, a user trigger, a system trigger, or a significant event trigger. The method 700 can identify a set of content items associated with a user account, at block 704. In some instances, the identified set of content items can include content items that have been created by, provided by, accessed by, shared by, shared with, or otherwise interacted with via the user account.

Then the example method 700 can acquire information associated with at least one of the set of content items or the user account, at block 706. In some embodiments, the information can include (but is not limited to) one or more properties of the set of content items or user account, metadata (e.g., tags) for the set or user account, various signals associated with the set or user account, and/or other data related to the set or user account.

The example method 700 can select a subset of content items out of the set of content items based on the information, at block 708. For example, the method 700 can utilize one or more selection algorithms (e.g., content item analysis techniques, content item ranking techniques, image classification techniques, etc.) to select the subset of content items. In some cases, each content item in the subset can satisfy specified selection criteria.

The example method 700 can further generate the multimedia content based on the subset of content items, at block 710. For example, the method 700 can place or insert at least some of the subset of content items as video frames (or portions thereof) to form or generate the multimedia content. In some instances, the example method 700 can generate the multimedia content by pre-rendering the multimedia content.

Figure 8:
FIG. 8 illustrates an example method for selecting and generating multimedia content, according to an embodiment of the present disclosure.
Figure 8:
Figure 8:

FIG. 8 illustrates an example method 800 for selecting content items and generating multimedia content, according to an embodiment of the present disclosure. Again, it should be appreciated that there can be additional, fewer, or alternative steps performed in similar or alternative orders, or in parallel, within the scope of the various embodiments unless otherwise stated.

The example method 800 can modify, based on one or more commands associated with the user account, the subset of content items to produce a modified set of content items, at block 802. For example, the method 800 can receive one or more user selections to form the modified set including content items that the user desires to be incorporated into the multimedia content.

The example method 800 can generate, in real-time, modified multimedia content based on the modified set of content items, at block 804. In some implementations, the method 800 can enable the modified multimedia content to be rendered in (or near) real-time at a computing device or user device, since the device can have local access to the modified set of content items on which the modified multimedia content is based.

The example method 800 can further provide, in real-time, the modified multimedia content generated based on the modified set of content items, at block 806. For example, upon selecting the modified subset of content items and rendering the modified multimedia content in real-time, the modified multimedia content can be immediately played, presented, viewed, or accessed, etc.

In some embodiments, content items created or provided, at the social networking system by the particular user or user account, can be synopsized within a specified time period (e.g., today, the past week, the past month, the past year, the past decade, etc.). For example, certain content items that are determined to be relevant, important, significant, meaningful, etc., to the particular user or user account can be selected in order to provide a summary of the specified time period experienced by the particular user or user account.

In some embodiments, the content items can be selected to incorporate diversity with respect to time. For example, at least a first content item in the selected subset of content items can be associated with a first time period and at least a second content item in the selected subset of content items can be associated with a second time period.

In some embodiments, the content items can be selected to incorporate diversity with respect to location. For example, at least a first content item in the selected subset of content items can be associated with a first location (e.g., based on a geolocation tag, based on GPS coordinates, etc.) and at least a second content item in the selected subset of content items can be associated with a second location.

In some embodiments, multimedia content can include rich-media content. In some embodiments, the user account can be associated with at least one of a user of a social networking system, an entity associated with the social networking system, a group associated with the social networking system, a post on the social networking system, an application provided via the social networking system, or an event created at the social networking system. For example, the user account can be associated with advertisers, events, pages, groups, news stories, comments within posts, and/or any nodes in a social networking graph.

In some embodiments, a significant event that might have occurred can be detected and the user account can be prompted by asking whether or not multimedia content should be generated for the possible significant event.

In some embodiments, privacy filters can be applied to the content items to filter out inappropriate or undesired content items. Inappropriate or undesired content items may be determined by the user, the social networking system, or both. In some cases, the filtering can occur before and/or after the ranking of the content items.

In some embodiments, ranking the content items can utilize historical coefficients associated with the content items. In some instances, the historical coefficients may qualitatively or quantitatively describe a measure of affinity between a user and the content items. The historical coefficients may reflect measures of affinity in the past between the user and the content items when the multimedia content is designed to reflect a chronology of important historical events. In some cases, the coefficients can be weighted in favor of social connections with whom the user (or user account) has interacted with recently. In some cases, because the coefficients can change over time (e.g., a coefficient can have a half-life of two weeks, such that after two weeks of no social interaction, then the coefficient decreases by half), the ranking of content items based on coefficients can be based on the time period of interest with respect to the multimedia content. In some instances, content items associated with high coefficients can be ranked highly.

It is further contemplated that there can be many other uses, applications, implementations, and/or variations associated with the various embodiments of the present disclosure.

Social Networking System—Example Implementation

Figure 9:
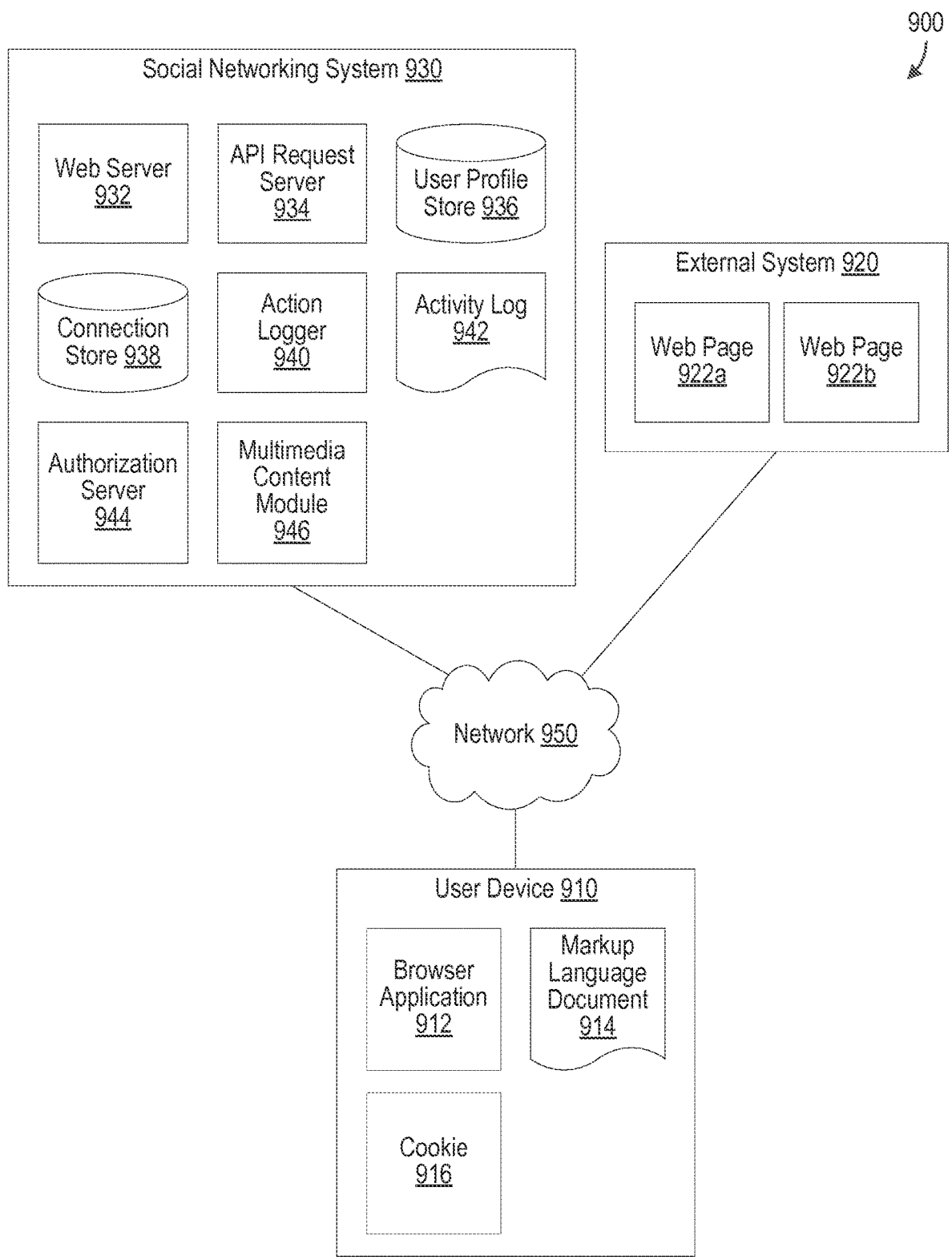
FIG. 9 illustrates a network diagram of an example system that can be utilized in various scenarios and/or environments, according to an embodiment of the present disclosure.

FIG. 9 illustrates a network diagram of an example system 900 that can be utilized in various embodiments for enhanced video encoding, in accordance with an embodiment of the present disclosure. The system 900 includes one or more user devices 910, one or more external systems 920, a social networking system 930, and a network 950. In an embodiment, the social networking service, provider, and/or system discussed in connection with the embodiments described above may be implemented as the social networking system 930. For purposes of illustration, the embodiment of the system 900, shown by FIG. 9, includes a single external system 920 and a single user device 910. However, in other embodiments, the system 900 may include more user devices 910 and/or more external systems 920. In certain embodiments, the social networking system 930 is operated by a social network provider, whereas the external systems 920 are separate from the social networking system 930 in that they may be operated by different entities. In various embodiments, however, the social networking system 930 and the external systems 920 operate in conjunction to provide social networking services to users (or members) of the social networking system 930. In this sense, the social networking system 930 provides a platform or backbone, which other systems, such as external systems 920, may use to provide social networking services and functionalities to users across the Internet.

The user device 910 comprises one or more computing devices that can receive input from a user and transmit and receive data via the network 950. In one embodiment, the user device 910 is a conventional computer system executing, for example, a Microsoft Windows compatible operating system (OS), Apple OS X, and/or a Linux distribution. In another embodiment, the user device 910 can be a device having computer functionality, such as a smart-phone, a tablet, a personal digital assistant (PDA), a mobile telephone, etc. The user device 910 is configured to communicate via the network 950. The user device 910 can execute an application, for example, a browser application that allows a user of the user device 910 to interact with the social networking system 930. In another embodiment, the user device 910 interacts with the social networking system 930 through an application programming interface (API) provided by the native operating system of the user device 910, such as iOS and ANDROID. The user device 910 is configured to communicate with the external system 920 and the social networking system 930 via the network 950, which may comprise any combination of local area and/or wide area networks, using wired and/or wireless communication systems.

In one embodiment, the network 950 uses standard communications technologies and protocols. Thus, the network 950 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 950 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 950 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 910 may display content from the external system 920 and/or from the social networking system 930 by processing a markup language document 914 received from the external system 920 and from the social networking system 930 using a browser application 912. The markup language document 914 identifies content and one or more instructions describing formatting or presentation of the content. By executing the instructions included in the markup language document 914, the browser application 912 displays the identified content using the format or presentation described by the markup language document 914. For example, the markup language document 914 includes instructions for generating and displaying a web page having multiple frames that include text and/or image data retrieved from the external system 920 and the social networking system 930. In various embodiments, the markup language document 914 comprises a data file including extensible markup language (XML) data, extensible hypertext markup language (XHTML) data, or other markup language data. Additionally, the markup language document 914 may include JavaScript Object Notation (JSON) data, JSON with padding (JSONP), and JavaScript data to facilitate data-interchange between the external system 920 and the user device 910. The browser application 912 on the user device 910 may use a JavaScript compiler to decode the markup language document 914.

The markup language document 914 may also include, or link to, applications or application frameworks such as FLASH™ or Unity™ applications, the SilverLight™ application framework, etc.

In one embodiment, the user device 910 also includes one or more cookies 916 including data indicating whether a user of the user device 910 is logged into the social networking system 930, which may enable modification of the data communicated from the social networking system 930 to the user device 910.

The external system 920 includes one or more web servers that include one or more web pages 922a, 922b, which are communicated to the user device 910 using the network 950. The external system 920 is separate from the social networking system 930. For example, the external system 920 is associated with a first domain, while the social networking system 930 is associated with a separate social networking domain. Web pages 922a, 922b, included in the external system 920, comprise markup language documents 914 identifying content and including instructions specifying formatting or presentation of the identified content.

The social networking system 930 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 930 may be administered, managed, or controlled by an operator. The operator of the social networking system 930 may be a human being, an automated application, or a series of applications for managing content, regulating policies, and collecting usage metrics within the social networking system 930. Any type of operator may be used.

Users may join the social networking system 930 and then add connections to any number of other users of the social networking system 930 to whom they desire to be connected. As used herein, the term "friend" refers to any other user of the social networking system 930 to whom a user has formed a connection, association, or relationship via the social networking system 930. For example, in an embodiment, if users in the social networking system 930 are represented as nodes in the social graph, the term "friend" can refer to an edge formed between and directly connecting two user nodes.

Connections may be added explicitly by a user or may be automatically created by the social networking system 930 based on common characteristics of the users (e.g., users who are alumni of the same educational institution). For example, a first user specifically selects a particular other user to be a friend. Connections in the social networking system 930 are usually in both directions, but need not be, so the terms "user" and "friend" depend on the frame of reference. Connections between users of the social networking system 930 are usually bilateral ("two-way"), or "mutual," but connections may also be unilateral, or "one-way." For example, if Bob and Joe are both users of the social networking system 930 and connected to each other, Bob and Joe are each other's connections. If, on the other hand, Bob wishes to connect to Joe to view data communicated to the social networking system 930 by Joe, but Joe does not wish to form a mutual connection, a unilateral connection may be established. The connection between users may be a direct connection; however, some embodiments of the social networking system 930 allow the connection to be indirect via one or more levels of connections or degrees of separation.

In addition to establishing and maintaining connections between users and allowing interactions between users, the social networking system 930 provides users with the ability to take actions on various types of items supported by the social networking system 930. These items may include groups or networks (i.e., social networks of people, entities, and concepts) to which users of the social networking system 930 may belong, events or calendar entries in which a user might be interested, computer-based applications that a user may use via the social networking system 930, transactions that allow users to buy or sell items via services provided by or through the social networking system 930, and interactions with advertisements that a user may perform on or off the social networking system 930. These are just a few examples of the items upon which a user may act on the social networking system 930, and many others are possible. A user may interact with anything that is capable of being represented in the social networking system 930 or in the external system 920, separate from the social networking system 930, or coupled to the social networking system 930 via the network 950.

The social networking system 930 is also capable of linking a variety of entities. For example, the social networking system 930 enables users to interact with each other as well as external systems 920 or other entities through an API, a web service, or other communication channels. The social networking system 930 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 930. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 930 modifies edges connecting the various nodes to reflect the relationships and interactions.

The social networking system 930 also includes user-generated content, which enhances a user's interactions with the social networking system 930. User-generated content may include anything a user can add, upload, send, or "post" to the social networking system 930. For example, a user communicates posts to the social networking system 930 from a user device 910. Posts may include data such as status updates or other textual data, location information, images such as photos, videos, links, music or other similar data and/or media. Content may also be added to the social networking system 930 by a third party. Content "items" are represented as objects in the social networking system 930. In this way, users of the social networking system 930 are encouraged to communicate with each other by posting text and content items of various types of media through various communication channels. Such communication increases the interaction of users with each other and increases the frequency with which users interact with the social networking system 930.

The social networking system 930 includes a web server 932, an API request server 934, a user profile store 936, a connection store 938, an action logger 940, an activity log 942, and an authorization server 944. In an embodiment of the invention, the social networking system 930 may include additional, fewer, or different components for various applications. Other components, such as network interfaces, security mechanisms, load balancers, failover servers, management and network operations consoles, and the like are not shown so as to not obscure the details of the system.

The user profile store 936 maintains information about user accounts, including biographic, demographic, and other types of descriptive information, such as work experience, educational history, hobbies or preferences, location, and the like that has been declared by users or inferred by the social networking system 930. This information is stored in the user profile store 936 such that each user is uniquely identified. The social networking system 930 also stores data describing one or more connections between different users in the connection store 938. The connection information may indicate users who have similar or common work experience, group memberships, hobbies, or educational history. Additionally, the social networking system 930 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 930, such as non-person entities, buckets, cluster centers, images, interests, pages, external systems, concepts, and the like are also stored in the connection store 938.

The social networking system 930 maintains data about objects with which a user may interact. To maintain this data, the user profile store 936 and the connection store 938 store instances of the corresponding type of objects maintained by the social networking system 930. Each object type has information fields that are suitable for storing information appropriate to the type of object. For example, the user profile store 936 contains data structures with fields suitable for describing a user's account and information related to a user's account. When a new object of a particular type is created, the social networking system 930 initializes a new data structure of the corresponding type, assigns a unique object identifier to it, and begins to add data to the object as needed. This might occur, for example, when a user becomes a user of the social networking system 930, the social networking system 930 generates a new instance of a user profile in the user profile store 936, assigns a unique identifier to the user account, and begins to populate the fields of the user account with information provided by the user.

The connection store 938 includes data structures suitable for describing a user's connections to other users, connections to external systems 920 or connections to other entities. The connection store 938 may also associate a connection type with a user's connections, which may be used in conjunction with the user's privacy setting to regulate access to information about the user. In an embodiment of the invention, the user profile store 936 and the connection store 938 may be implemented as a federated database.

Data stored in the connection store 938, the user profile store 936, and the activity log 942 enables the social networking system 930 to generate the social graph that uses nodes to identify various objects and edges connecting nodes to identify relationships between different objects. For example, if a first user establishes a connection with a second user in the social networking system 930, user accounts of the first user and the second user from the user profile store 936 may act as nodes in the social graph. The connection between the first user and the second user stored by the connection store 938 is an edge between the nodes associated with the first user and the second user. Continuing this example, the second user may then send the first user a message within the social networking system 930. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 930 (or, alternatively, in an image maintained by another system outside of the social networking system 930). The image may itself be represented as a node in the social networking system 930. This tagging action may create edges between the first user and the second user as well as create an edge between each of the users and the image, which is also a node in the social graph. In yet another example, if a user confirms attending an event, the user and the event are nodes obtained from the user profile store 936, where the attendance of the event is an edge between the nodes that may be retrieved from the activity log 942. By generating and maintaining the social graph, the social networking system 930 includes data describing many different types of objects and the interactions and connections among those objects, providing a rich source of socially relevant information.

The web server 932 links the social networking system 930 to one or more user devices 910 and/or one or more external systems 920 via the network 950. The web server 932 serves web pages, as well as other web-related content, such as Java, JavaScript, Flash, XML, and so forth. The web server 932 may include a mail server or other messaging functionality for receiving and routing messages between the social networking system 930 and one or more user devices 910. The messages can be instant messages, queued messages (e.g., email), text and SMS messages, or any other suitable messaging format.

The API request server 934 allows one or more external systems 920 and user devices 910 to call access information from the social networking system 930 by calling one or more API functions. The API request server 934 may also allow external systems 920 to send information to the social networking system 930 by calling APIs. The external system 920, in one embodiment, sends an API request to the social networking system 930 via the network 950, and the API request server 934 receives the API request. The API request server 934 processes the request by calling an API associated with the API request to generate an appropriate response, which the API request server 934 communicates to the external system 920 via the network 950. For example, responsive to an API request, the API request server 934 collects data associated with a user, such as the user's connections that have logged into the external system 920, and communicates the collected data to the external system 920. In another embodiment, the user device 910 communicates with the social networking system 930 via APIs in the same manner as external systems 920.

The action logger 940 is capable of receiving communications from the web server 932 about user actions on and/or off the social networking system 930. The action logger 940 populates the activity log 942 with information about user actions, enabling the social networking system 930 to discover various actions taken by its users within the social networking system 930 and outside of the social networking system 930. Any action that a particular user takes with respect to another node on the social networking system 930 may be associated with each user's account, through information maintained in the activity log 942 or in a similar database or other data repository. Examples of actions taken by a user within the social networking system 930 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 930, the action is recorded in the activity log 942. In one embodiment, the social networking system 930 maintains the activity log 942 as a database of entries. When an action is taken within the social networking system 930, an entry for the action is added to the activity log 942. The activity log 942 may be referred to as an action log.

Additionally, user actions may be associated with concepts and actions that occur within an entity outside of the social networking system 930, such as an external system 920 that is separate from the social networking system 930. For example, the action logger 940 may receive data describing a user's interaction with an external system 920 from the web server 932. In this example, the external system 920 reports a user's interaction according to structured actions and objects in the social graph.

Other examples of actions where a user interacts with an external system 920 include a user expressing an interest in an external system 920 or another entity, a user posting a comment to the social networking system 930 that discusses an external system 920 or a web page 922a within the external system 920, a user posting to the social networking system 930 a Uniform Resource Locator (URL) or other identifier associated with an external system 920, a user attending an event associated with an external system 920, or any other action by a user that is related to an external system 920. Thus, the activity log 942 may include actions describing interactions between a user of the social networking system 930 and an external system 920 that is separate from the social networking system 930.

The authorization server 944 enforces one or more privacy settings of the users of the social networking system 930. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 920, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 920. One embodiment allows the specification of the set of entities to comprise an enumeration of entities. For example, the user may provide a list of external systems 920 that are allowed to access certain information. Another embodiment allows the specification to comprise a set of entities along with exceptions that are not allowed to access the information. For example, a user may allow all external systems 920 to access the user's work information, but specify a list of external systems 920 that are not allowed to access the work information. Certain embodiments call the list of exceptions that are not allowed to access certain information a "block list". External systems 920 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 944 contains logic to determine if certain information associated with a user can be accessed by a user's friends, external systems 920, and/or other applications and entities. The external system 920 may need authorization from the authorization server 944 to access the user's more private and sensitive information, such as the user's work phone number. Based on the user's privacy settings, the authorization server 944 determines if another user, the external system 920, an application, or another entity is allowed to access information associated with the user, including information about actions taken by the user.

The social networking system 930 can include a multimedia content module 946. In some embodiments, the multimedia content module 946 can be implemented as the multimedia content module 102 of FIG. 1. The multimedia content module 946 can be configured to detect a trigger event for generating multimedia content. The multimedia content module 946 can identify a set of content items associated with a user account, such as a user account within the social networking system 930. Furthermore, information associated with at least one of the set of content items or the user account can be acquired by the multimedia content module 946. A subset of content items can be selected by the multimedia content module 946 out of the set of content items based on the information. In some instances, each content item in the subset can satisfy specified selection criteria. The multimedia content module 946 can be further configured to generate the multimedia content based on the subset of content items.

Hardware Implementation

Figure 10:
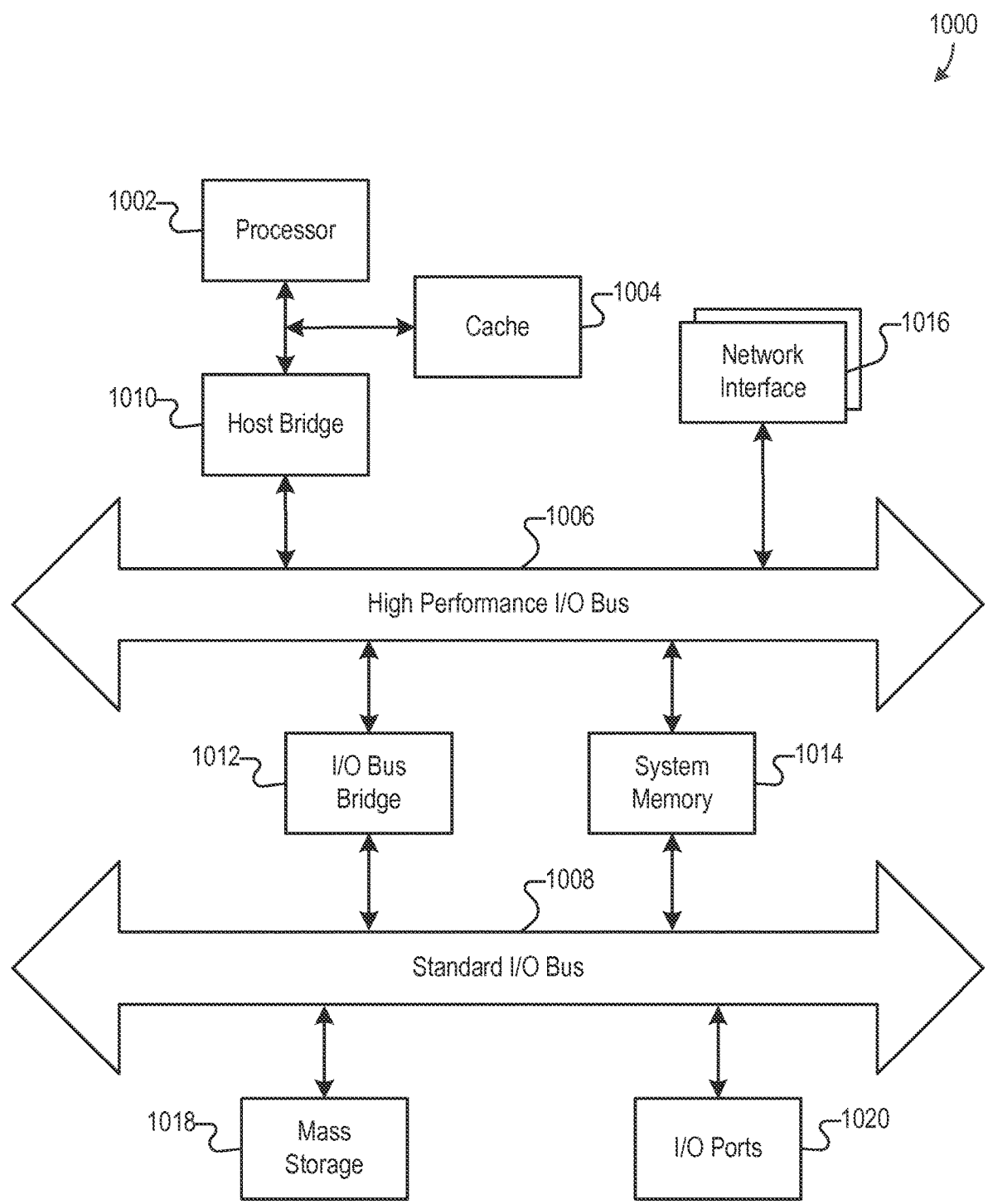
FIG. 10 illustrates an example of a computer system that can be utilized in various scenarios and/or environments, according to an embodiment of the present disclosure.

The foregoing processes and features can be implemented by a wide variety of machine and computer system architectures and in a wide variety of network and computing environments. FIG. 10 illustrates an example of a computer system 1000 that may be used to implement one or more of the embodiments described herein in accordance with an embodiment of the invention. The computer system 1000 includes sets of instructions for causing the computer system 1000 to perform the processes and features discussed herein. The computer system 1000 may be connected (e.g., networked) to other machines. In a networked deployment, the computer system 1000 may operate in the capacity of a server machine or a client machine in a client-server network environment, or as a peer machine in a peer-to-peer (or distributed) network environment. In an embodiment of the invention, the computer system 1000 may be the social networking system 1030, the user device 910, and the external system 1020, or a component thereof. In an embodiment of the invention, the computer system 1000 may be one server among many that constitutes all or part of the social networking system 1030.

The computer system 1000 includes a processor 1002, a cache 1004, and one or more executable modules and drivers, stored on a computer-readable medium, directed to the processes and features described herein. Additionally, the computer system 1000 includes a high performance input/output (I/O) bus 1006 and a standard I/O bus 1008. A host bridge 1010 couples processor 1002 to high performance I/O bus 1006, whereas I/O bus bridge 1012 couples the two buses 1006 and 1008 to each other. A system memory 1014 and one or more network interfaces 1016 couple to high performance I/O bus 1006. The computer system 1000 may further include video memory and a display device coupled to the video memory (not shown).

Mass storage 1018 and I/O ports 1020 couple to the standard I/O bus 1008. The computer system 1000 may optionally include a keyboard and pointing device, a display device, or other input/output devices (not shown) coupled to the standard I/O bus 1008. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1000 are described in greater detail below. In particular, the network interface 1016 provides communication between the computer system 1000 and any of a wide range of networks, such as an Ethernet (e.g., IEEE 802.3) network, a backplane, etc. The mass storage 1018 provides permanent storage for the data and programming instructions to perform the above-described processes and features implemented by the respective computing systems identified above, whereas the system memory 1014 (e.g., DRAM) provides temporary storage for the data and programming instructions when executed by the processor 1002. The I/O ports 1020 may be one or more serial and/or parallel communication ports that provide communication between additional peripheral devices, which may be coupled to the computer system 1000.

The computer system 1000 may include a variety of system architectures, and various components of the computer system 1000 may be rearranged. For example, the cache 1004 may be on-chip with processor 1002. Alternatively, the cache 1004 and the processor 1002 may be packed together as a "processor module", with processor 1002 being referred to as the "processor core". Furthermore, certain embodiments of the invention may neither require nor include all of the above components. For example, peripheral devices coupled to the standard I/O bus 1008 may couple to the high performance I/O bus 1006. In addition, in some embodiments, only a single bus may exist, with the components of the computer system 1000 being coupled to the single bus. Furthermore, the computer system 1000 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1000 that, when read and executed by one or more processors, cause the computer system 1000 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1000, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1002. Initially, the series of instructions may be stored on a storage device, such as the mass storage 1018. However, the series of instructions can be stored on any suitable computer readable storage medium. Furthermore, the series of instructions need not be stored locally, and could be received from a remote storage device, such as a server on a network, via the network interface 1016. The instructions are copied from the storage device, such as the mass storage 1018, into the system memory 1014 and then accessed and executed by the processor 1002. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1000 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A computer-implemented method comprising:
    detecting, by a computing system, a trigger event for generating a multimedia content item designed to reflect an event associated with a user account, wherein the multimedia content item includes video content;
    identifying, by the computing system, a set of content items associated with the user account;
    acquiring, by the computing system, the set of content items and information associated with the set of content items or the user account;
    determining, by the computing system, relevance of each content item of the set of the content items relative to the user account based on the information;
    ranking, by the computing system, the relevance of the set of content items based on a ranking algorithm,
        wherein the ranking algorithm increases rankings for at least some content items determined by an image classification process to contain one or more faces; and
        wherein the ranking algorithm ranks the set of content items containing one or more faces based on affinity coefficients between the user account and one or more persons identified by a facial recognition technique from the one or more faces;
    selecting, by the computing system, a subset of content items out of the set of content items, wherein each content item in the subset satisfies one or more ranking thresholds; and
    generating, by the computing system, the multimedia content item based on the subset of content items, wherein generating the multimedia content item comprises:
        converting non-visual content items in the subset of content items into image representations of the non-visual content items, wherein the non-visual content items include at least one of a text, a post, a status update, or an audio item; and
        placing the image representations of the non-visual content items into the video content.

2. The computer-implemented method of claim 1, further comprising:
    providing the user account with access to the multimedia content item, wherein the generating the multimedia content item includes pre-rendering the multimedia content item prior to the providing the user account with the access to the multimedia content item.

3. The computer-implemented method of claim 1, wherein the generating the multimedia content item includes processing the subset of content items by one or more servers of a social networking system, and wherein an amount of the processing is based on a level of user traffic experienced by the social networking system.

4. The computer-implemented method of claim 1, further comprising:
    modifying, based on one or more commands associated with the user account, the subset of content items to produce a modified set of content items;
    generating, in real-time, a modified multimedia content item based on the modified set of content items; and
    providing, in real-time, the modified multimedia content item generated based on the modified set of content items.

5. The computer-implemented method of claim 4, wherein the generating, in real-time, the modified multimedia content item based on the modified set of content items includes transmitting at least one instruction to a computing device associated with the user account, wherein the modified multimedia content item is renderable in real-time using HTML5 by the computing device.

6. The computer-implemented method of claim 1, wherein each content item in the subset of content items is at least one of a post, a status update, or an image, and wherein the multimedia content item includes video.

7. The computer-implemented method of claim 1, wherein the generating the multimedia content item includes providing audio content, the audio content being selected based on one or more commands provided via the user account.

8. The computer-implemented method of claim 7, further comprising:
    analyzing the audio content to determine one or more beats of the audio content; and
    synchronizing, within an allowable time deviation, at least a portion of the multimedia content item with the one or more beats of the audio content.

9. The computer-implemented method of claim 1, wherein the trigger event is associated with at least one of a significant event associated with the user account within a social networking system, a user command initiated via the user account, or a system command of the social networking system.

10. The computer-implemented method of claim 9, wherein the trigger event is associated with the significant event associated with the user account, and wherein the detecting of the trigger event includes analyzing at least one of a post associated with the user account, a status update associated with the user account, a comment associated with the user account, a tag associated with the user account, or an interaction associated with the user account.

11. The computer-implemented method of claim 1, wherein the selecting the subset of content items out of the set of content items includes ranking the set of content items based on a ranking algorithm, wherein the specified selection criteria include one or more ranking thresholds, and wherein each content item in the subset of content items satisfies the one or more ranking thresholds.

12. The computer-implemented method of claim 11, wherein the ranking algorithm decreases rankings for at least some content items determined by the image classification process to include at least one of memes or food.

13. The computer-implemented method of claim 11, wherein the ranking algorithm is based on social interaction analysis.

14. The computer-implemented method of claim 13, wherein the ranking algorithm increases rankings for at least some content items determined by the social interaction analysis to be associated with a current relationship associated with the user account and decreases rankings for at least some content items determined by the social interaction analysis to be associated with a terminated relationship associated with the user account.

15. The computer-implemented method of claim 1, wherein at least a first content item in the subset of content items is associated with a first time period and wherein at least a second content item in the subset of content items is associated with a second time period.

16. The computer-implemented method of claim 1, wherein at least a first content item in the subset of content items is associated with a first location and wherein at least a second content item in the subset of content items is associated with a second location.

17. The computer-implemented method of claim 1, wherein the user account is associated with at least one of a user of a social networking system, an entity associated with the social networking system, a group associated with the social networking system, a post on the social networking system, an application provided via the social networking system, or an event created through the social networking system.

18. A system comprising:
at least one processor; and
a memory storing instructions that, when executed by the at least one processor, cause the system to perform:
    detecting a trigger event for generating a multimedia content item designed to reflect an event associated with a user account, wherein the multimedia content item includes video content;
    identifying a set of content items associated with the user account;
    acquiring the set of content items and information associated with of the set of content items or the user account;
    determining relevance of each content item of the set of the content items relative to the user or user account based on the information;
    ranking the relevance of the set of content items based on a ranking algorithm,
        wherein the ranking algorithm increases rankings for at least some content items determined by an image classification process to contain one or more faces; and
        wherein the ranking algorithm ranks the set of content items containing one or more faces based on affinity coefficients between the user account and one or more persons identified by a facial recognition technique from the one or more faces;
    selecting a subset of content items out of the set of content items, wherein each content item in the subset satisfies one or more ranking thresholds; and
    generating the multimedia content item based on the subset of content items, wherein generating the multimedia content item comprises:
        converting non-visual content items in the subset of content items into image representations of the non-visual content items, wherein the non-visual content items include at least one of a text, a post, a status update, or an audio item; and
        placing the image representations of the non-visual content items into the video content.

19. A non-transitory computer-readable storage medium including instructions that, when executed by at least one processor of a computing system, cause the computing system to perform:
    detecting a trigger event for generating a multimedia content item designed to reflect an event associated with a user account, wherein the multimedia content item includes video content;
    identifying a set of content items associated with the user account;
    acquiring the set of content items and information associated with of the set of content items or the user account;
    determining relevance of each content item of the set of the content items relative to the user or user account based on the information;
    ranking the relevance of the set of content items based on a ranking algorithm,
        wherein the ranking algorithm increases rankings for at least some content items determined by an image classification process to contain one or more faces; and
        wherein the ranking algorithm ranks the set of content items containing one or more faces based on affinity coefficients between the user account and one or more persons identified by a facial recognition technique from the one or more faces;
    selecting a subset of content items out of the set of content items, wherein each content item in the subset satisfies one or more ranking thresholds; and
    generating the multimedia content item based on the subset of content items, wherein generating the multimedia content item comprises:
        converting non-visual content items in the subset of content items into image representations of the non-visual content items, wherein the non-visual content items include at least one of a text, a post, a status update, or an audio item; and
        placing the image representations of the non-visual content items into the video content.

* * * * *